US005682820A

United States Patent [19]
Arata

[11] Patent Number: 5,682,820
[45] Date of Patent: Nov. 4, 1997

[54] TRANSPORT SYSTEM

[75] Inventor: Horinouchi Arata, Ise, Japan

[73] Assignee: Shinko Electric Co., Ltd., Tokyo, Japan

[21] Appl. No.: 580,305

[22] Filed: Dec. 28, 1995

[30] Foreign Application Priority Data

| Jan. 11, 1995 | [JP] | Japan | 7-002920 |
| Jan. 11, 1995 | [JP] | Japan | 7-002921 |
| Jan. 11, 1995 | [JP] | Japan | 7-002922 |

[51] Int. Cl.$^6$ ............................................. B61L 27/00
[52] U.S. Cl. ................................................... 104/88.04
[58] Field of Search ..................... 104/88.01, 88.02, 104/88.03, 88.04, 88.05, 295, 296; 364/478; 246/3, 4, 5, 62

[56] References Cited

U.S. PATENT DOCUMENTS

| 4,630,216 | 12/1986 | Tyler et al. | 104/88.04 |
| 4,669,047 | 5/1987 | Chucta | 104/88.04 |
| 4,736,687 | 4/1988 | Grube et al. | 104/88.04 |
| 4,766,547 | 8/1988 | Modery et al. | 104/88.04 |
| 4,915,030 | 4/1990 | Matsuo et al. | 104/88.04 |
| 5,402,355 | 3/1995 | Bahlmann et al. | 104/88.04 |

FOREIGN PATENT DOCUMENTS

2194498  3/1988  United Kingdom ................. 104/88.03

Primary Examiner—Mark T. Le
Attorney, Agent, or Firm—Darby & Darby

[57] ABSTRACT

A linear motor driven transport system is assembled from a number of basic operating blocks, each operating block being constituted by an operating block and a dedicated control facility which includes a controller. The basic block is obtained by dividing the entire system route into functional blocks, each block containing the essential operating elements such as tracks, branching standby tracks, carriers, stations and a controller to control these devices. A carrier can be called for a transport duty within one block as well as from any other operating block, and spare carriers are parked in standby tracks and can be called to duty in any operating blocks. When a carrier is available within a block, the movement of the carriers is controlled by a dedicated controller for that block based on the destination of the carrier and the carrier location based on output of position sensors disposed along the tracks. When an available carrier is destined to another block, carrier movement is determined on the basis of exchange of information concerning the identification number for the carrier and the destination number stored in the relevant operating block to determine the optimum route. Because the entire system is assembled from basic blocks, the system can be expanded or contracted readily by adding blocks to or subtracting blocks from the existing system.

8 Claims, 4 Drawing Sheets

TRANSPORT SYSTEM

BACKGROUND OF THE INVENTION

1. Field of the Invention

The present invention relates in general to an unmanned transport system for moving goods from one station another, and relates in particular to a linear motor driven transport system.

2. Description of the Related Art

In daily operations of hospitals, there are numerous needs for transporting small items such as prescriptions, medicines and medical test samples such as blood, urine and the like, and much of nurse's time is spent in transporting of such items from one place to another. In order that the nurses can concentrate on their important task of nursing the patients, unmanned transport systems are beginning to be introduced into many hospitals. One such transport system is a linear induction motor (shortened to linear motor) driven transport system having a linear motor as a source of driving power for a transport vehicle referred to as a carrier, which provides a quiet highspeed transport.

Such a linear motor driven transport system operates in association with stations situated in such places as examination rooms and offices for loading/unloading of goods to and from carriers. The stations are linked with a main track, which is obtrusively disposed behind the ceiling, for example, by branching tracks, and are designed to enable parking of one or more carriers. Each station is equipped with an operator panel to request empty in-bound carriers into the station or to send out-bound loaded carriers to destinations. The empty vehicles wait be called in storage buffers having stand-by tracks which are disposed in bypass routes to the main route.

When an operator of a station issues a command for an in-bound carrier, the operating control for the transport system selects an empty carrier waiting in a storage buffer to head to the requesting station. The operator at the requesting station loads goods into the carrier and presses a number for the destination station to forward the carrier to the main route via the bypass route.

The conventional operation control system presented above controls positions of each carrier by recognizing the locations of several carriers simultaneously by the signals output from the position sensors disposed along the rails of the main route. Because the carrier can move at a high speed up to 5 m/s, the control operation requires a highspeed central processor unit (CPU) and large capacity memories. Therefore, when the scale of the transport system becomes very large, the capacity of the conventional control device is insufficient to provide control over each carrier in an expanded system, and presented a barrier to an expansion of the existing transport system.

Another operational problem occurs when there are more than the capacity of carriers to be parked at a station, or when a carrier is heading toward a station when an abnormal situation arises at the station, the carriers which cannot enter the destination station must wait on the main track, thus presenting an obstacle to the movement of other carriers and disrupting the operation of the entire system.

Another operational problem occurs when an operator requests an empty carrier to a station, and, unbeknown to him, there is an in-bound loaded carrier heading to his station, which means that the station will be receiving two carriers in succession. The operator loads intended goods on the loaded carrier which arrives first, after which the empty requested carrier arrives to receive the already departed goods. This type of carrier movement represents waste and inefficiency.

Also, these carriers are designed to carry small goods in containers provided in each carrier. Because of hygiene and other restrictions, different types of goods are not mixed in one container, and therefore, the items are classified into groups of like items so that each group of items is transported along its designated route. Other approach to this problem requires that containers be replaced for different types of goods. However, both of these approaches present problems. It is costly to provide a dedicated route for each group, and many such routes to be provided would require a large installation space. The approach to replacing the containers is cumbersome and is not suitable in an emergency situation.

Furthermore, in the systems described above, several storage buffers are provided for a main track so that a requested carrier can be supplied from the nearest storage buffer. Replacement of carriers in the storage buffer is made only when an empty carrier is returned from the nearest station to the storage buffer. Therefore, a busy station, which requests empty carriers frequently, experiences a shortage of empty carriers. This is resolved by sending an empty carrier from some remote storage buffer to the storage buffer facing a shortage or to send an empty carrier from a remote storage buffer directly to the station requesting an empty carrier. This method is time-consuming, and more efficient system of supplying empty carriers is needed.

SUMMARY OF THE INVENTION

It is an object of the present invention to provide a flexible transport system which can be utilized to construct a large transport system readily. Another object of the invention is to provide a transport system not having a storage buffer on the main track of the system so that a waiting carrier on the main line does not interfere with the operation of other carriers. Another object is to provide a transport system to minimize wasted motions of the carriers.

The first object has been achieved in a transport system comprising: a plurality of station means for controlling a movement of a carrier including a movement to a destination; track means having position sensors for detecting a location of the carrier for providing the movement between the plurality of station means; and a plurality of operation control means, each assigned to control devices in an assigned block in a group of operating blocks formed by a functional division of the transport system into operating blocks; wherein an operation control means controls a movement of the carrier based on the destination and signals output from the position sensors when the destination station is located within the assigned block, and the operation control means mutually exchange operational data, including an identification number for the carrier and the destination stored in own memory, with other stations when the destination is located in another block.

According to the transport system presented above, the main track is pre-divided into functional operating blocks to maximize the efficiency of the system. An operation controller provided in one operating block controls the movement of carriers within its assigned block, and when a destination is outside of the assigned block, the operation controller communicates with an operation controller in another block by means of an ID number and a device number and the like.

For example, when carrier is moving from a first station in a first block to a second station in a second block, the first controller which controls the movement of the carrier within the first block decides the carrier movement on the basis of the movement data, including destination data specified by the first station and the location data according to the position sensors. The first controller forwards the movement data to a second controller which controls the movement of the carrier in the second block. As the carrier moves into the second block, the second controller takes over the control of the carrier movement within the second block on the basis of the movement data forwarded. In other words, the carrier is transferred from one operating block to another operating block guided by the movement data which is forwarded successively from one controller to another controller located in the direction of the movement of the carrier.

Therefore, a large-scale transport system having a long length of tracks can be constructed readily by adding operating blocks, as needed, along with a dedicated controller for each operating block. If it is desired to scale down the system, unnecessary blocks can be removed along with their dedicated controllers. Therefore, it is clear that the present transport system can be constructed flexibly to meet not only the current needs but to meet anticipated future needs. Furthermore, since the controller needs to control only the movement of the carrier within its own block, so, compared with a system managed by a system controller for the entire stock of carriers, the load imposed on each controller is reduced considerably.

Another object of providing a transport system suitable for use in an hospital environment has been achieved in a transport system comprising: a plurality of carriers each designated to carry a specific class of goods; a plurality of station means for controlling a movement of the plurality of carries wherein each stations means is designated to allow entry of a carrier carrying a specific class of goods; track means for providing the movement between the plurality of station means; operation control means for controlling a movement of a carrier based on information related to the specific class of goods contained in a carrier and the station means allowing entry of a carrier carrying a specific class of goods.

According to the transport system presented, each operation controller memorizes carrier types designated to carry pre-determined class of goods as well as the carrier types allowed in each station within own assigned operating block, and controls the carrier movement therewith. Therefore, if a carrier is judged to be unqualified to enter a station, for reasons of hygiene and sanitation, the entry will be denied, thus preserving the hygienic safety of the station. It is clear that the present transport system is ideally suited to situation when a hygienic safety is highly demanded, such as in a hospital. Another advantage of the present transport system is that, because the same tracks can be used to carry many different carrier types, the cost of installing the system is reduced, and additionally, three is no need to change the containers for specific goods, and the operation is not impeded in an emergency situation.

A modified form of the transport apparatus comprises: a plurality of carriers each designated to carry a specific class of goods; a plurality of station means for controlling a movement of the plurality of carries wherein each stations means is designated to allow entry of a carrier carrying a specific class of goods; track means, having a plurality of position sensors, for providing the movement between the plurality of station means; a plurality of operation control means, each assigned to control devices in an assigned block in a group of operating blocks formed by a functional division of the transport system into operating blocks, wherein an operation control means controls a movement of the carrier based on the destination and signals output from the position sensors when the destination station is located within the assigned block, and the operation control means performs a mutual exchange of operational data, including an identification number for the carrier and the destination stored in own memory, with other stations when the destination is located in another block, and outputs operating status information for reporting operating conditions of devices disposed within the assigned block; and system operation management means having an internal memory means for storing class information associated with the specific class for the carrier and the station means, and for managing movement of carriers based on the class information and the operating status information.

According to the transport system presented above, it is possible to not only provide a hygienic and low cost transportation within a hospital, for example, but also to perform efficient operation of the system, because the system is provided with a system operation management controller to oversee the operation of all the dedicated controllers. The system operation management controller minimizes any carriers stopping on the standby buffer for a long period of time to interfere with the operation of other carriers, unlike the conventional transport systems having storage buffers in the main route.

Another object to standardize the request time for an in-bound carrier has been achieved in a transport system comprising: a plurality of station means for controlling a movement of a carrier; track means having position sensors for providing the movement between the stations means; a plurality of standby track means branching from the track means for storage of in-bound carriers; a plurality of operation control means for controlling a movement of the carrier based on command from the station means and carrier position information derived from the plurality of position sensors; wherein the operation control means supplies additional in-bound carriers from other standby track means, when a quantity of in-bound carriers in the standby track means is not more than a specific quantity.

According to the transport system presented above, when the quantity of empty carriers waiting in the standby tracks nearest to a requesting station is reduced below a specific quantity, the operation controller supplies carriers from a nearby standby tracks, therefore, all the standby tracks are always stocked with a minimum quantity of carriers, and never is subjected to a situation of having no carrier to supply, to provide a standardized time for responding to a request.

Another modified form of the present transport system comprises: a plurality of station means for controlling a movement of a carrier including a destination; track means having position sensors for providing said movement between said plurality of stations means; a plurality of standby track means branching from said track means for storage of in-bound carriers; a plurality of operation control means, each assigned to control devices in an assigned block in a group of operating blocks formed by a functional division of said transport system, wherein an operation control means controls a movement of said carrier based on said destination and signals output from said position sensors when said destination station is located within said assigned block, and said operation control means performs a mutual exchange of operational data, including an identification number for said carrier and said destination, with other stations when said destination is located in another block, and outputs operating status information for reporting operating conditions of devices disposed within said assigned block, and system operation management means for controlling said plurality of operation controls means based on said operating status information, and for supplying additional in-bound carriers from other standby track means, when a quantity of in-bound carriers in said standby track means is not more than a specific quantity.

According to the transport system presented above, not only the response time is standardized, but the overall efficiency of the system operation is improved by the system operation management controller. The chances of a carrier being held up in the standby buffer for a long time, because of reasons such as a denied entry to the requesting station, is minimized by the system operation management controller overseeing the operation of all the operation controllers.

DESCRIPTION OF THE PREFERRED EMBODIMENTS

An application of the transport system to a hospital setting will be explained with reference to FIGS. 1 to 4.

Figure 1:
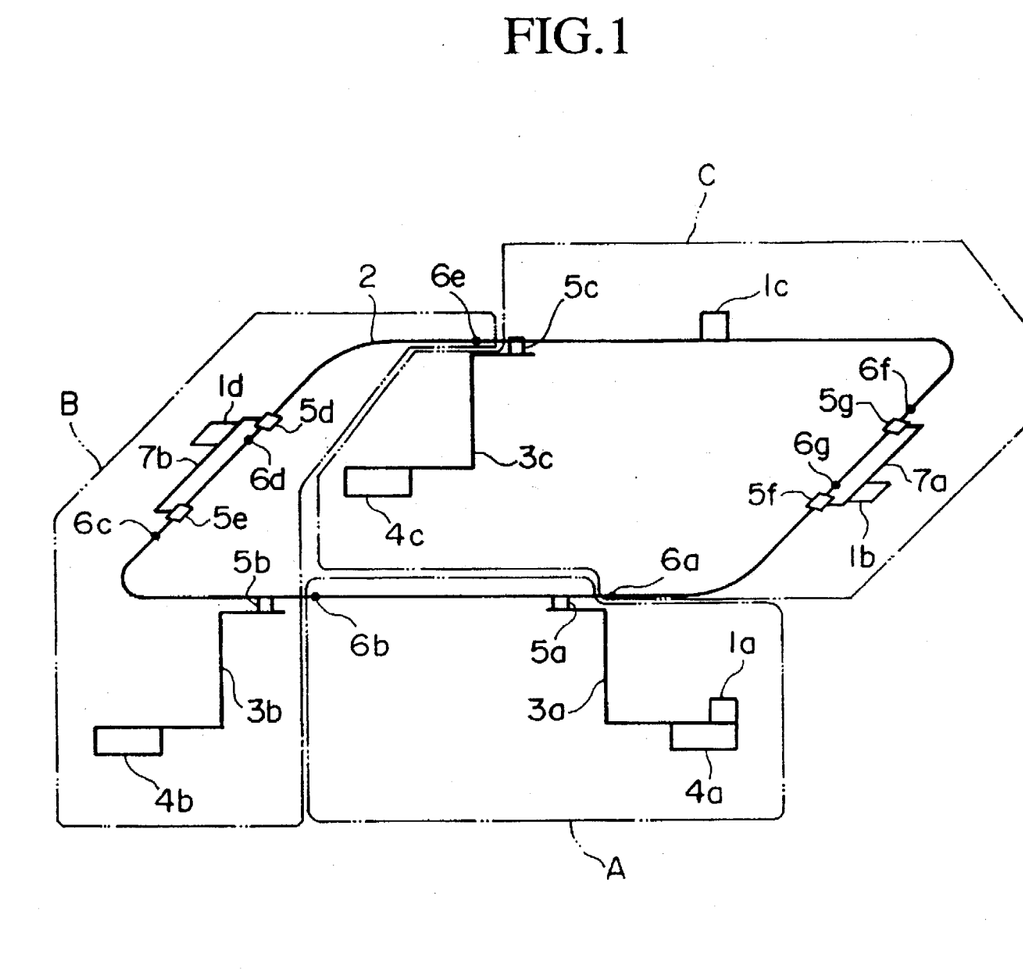
FIG. 1 is a schematic illustration of an example of the layout of the transport system of the present invention.

In FIG. 1, the overall system is shown to comprise: carriers $1a$–$1d$; a main route 2; branch routes $3a$–$3c$; stations $4a$–$4c$; branching devices $5a$–$5g$; standby buffers $6a$–$6g$; and storage buffers $7a$, $7b$.

Each of the carriers $1a$–$1d$ is equipped with containers and a secondary conductor member which constitutes a part of the linear motor drive, and transports goods by travelling along the main route 2 as well as the branch routes $3a$–$3c$. These carriers $1a$–$1d$ are divided into four groups depending on the type of items to be carried in the containers: in this case, prescription carriers for carrying only prescriptions, sample carriers for carrying only test samples such as blood and urine samples, drug carriers for carrying only pharmaceutical goods, and general goods carriers for carrying other types of goods.

The main route 2 comprises tracks joining each of the stations $4a$–$4c$, and are unobtrusively installed behind the ceiling section on each floor. The branch routes $3a$–$3c$ comprise tracks joining the main route 2 and each of the stations $4a$–$4c$. The main route 2 and the branch routes $3a$–$3c$ are provided with primary coils, which constitute the counterpart of secondary coils in a linear drive, and position sensors disposed at a specific interval to detect the presence of the carriers $1a$–$1d$. A primary coil and a secondary coil constitute a linear motor drive, and the carrier vehicles are moved by the current flowing in the primary coil.

Figure 2:
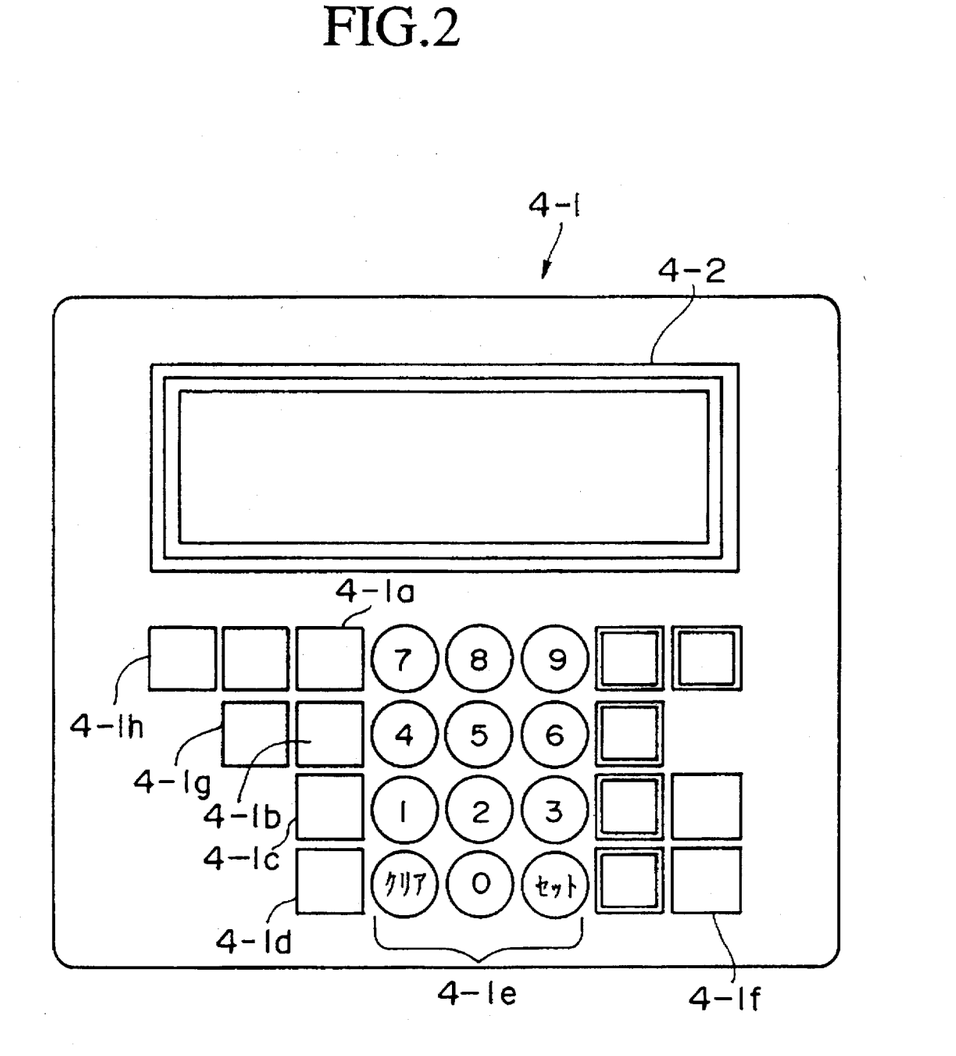
FIG. 2 is an example of the control panel used in the transport system.

The stations $4a$–$4c$ linked by the main route 2 are disposed in each of the examination rooms and offices, and each station is provided with a stopping berth for carrier parking. The types of carriers which can enter stations $4a$–$4c$ are pre-determined by the hygienic requirements of the stations $4a$–$4c$. In addition to the dead-end type of stations $4a$–$4c$, there are through-stations provided with an entrance and an exit for the carriers $1a$–$1d$. Such through-stations are provided with a plurality of stopping berths. Each of the stations $4a$–$4c$ is equipped with a control panel 4-1 as shown in FIG. 2 to issue transport commands to the carriers $1a$–$1d$, and is provided with the following function keys.

(a) Sample in-key 4-$1a$ to generates an in-bound command for an empty sample carrier.

(b) Prescription in-key 4-$1b$ to generates an in-bound command for an empty prescription carrier.

(c) Drug in-key 4-$1c$ to generates an in-bound command for an empty drug carrier.

(d) General in-key 4-$1d$ to generates an in-bound command for an empty general carrier.

(e) Number-key 4-$1e$ to generates a device number to correspond to a destination.

(f) Out-bound key 4-$1f$ to generates an out-bound command for a carrier to proceed out of a station.

(g) Return-key 4-$1g$ to generate a return command for an out-bound carrier.

(h) Close-key 4-$1h$ to generate a close command to shut down a station.

The control panel 4-1 is also provided with a liquid crystal display (LCD) screen 4-2 to display various messages concerning the operation of the carriers $1a$–$1d$. As indicated above, the operator in one station $1a$, for example, is not only able to shut down the operation of his own station through the control panel 4-1, but also to communicate with other stations through interphones provided in each of the stations $1a$–$1d$.

The branching devices $5a$–$5g$ are used to switch the tracks for the carriers $1a$–$1d$ from the main route 2 to branch routes $3a$–$3c$ or vice versa. The branching devices $5a$–$5g$ include two types: one type is a horizontal shifter to move a part of the track laterally; and the other type is a vertical shifter to move a part of the track vertically.

The standby buffers $6a$–$6g$ serve as temporary holding spaces for the carriers $1a$–$1d$, and one standby buffer is provided in each front and rear of the branching devices $5a$–$5g$. The storage buffers $7a$, $7b$ are situated in bypass locations with respect to the main route 2, and serve as a waiting space for the empty carriers. The storage buffers $7a$, $7b$ are provided with many standby buffers thereby allowing a pool of several empty carriers to assume a standby position.

The main route 2 is divided into operating zones with functional boundaries drawn through front and back of each branching devices $5a$–$5g$. For example, as shown in FIG. 2, the main route 2 is divided into three operating zones: one zone from a branching device $5a$ to a standby buffer $6b$; from a branching device $5b$ to a standby buffer $6e$; and a branching device $5c$ to a standby buffer $6a$. The route from a branch route $3a$ to station $4a$ forms a travelling zone; the route from branch route $3b$ to station $4b$ forms a travelling zone; and the route from branch route $3c$ to station $4c$ forms another travelling zone.

There can be many travelling zones in the transport system, but adjacent travelling zones constitute an operating block for functional purposes. For example, the zone from branching device $5a$ to standby buffer $6b$ together with branch route $3a$ and station $4a$ form an operating block A; the zone from branching device $5b$ to standby buffer $6e$ together with branch route $3b$, station $4b$, branching devices $5d$, $5e$ and storage buffer $7b$ form an operating block B; and the zone from branching device $5c$ to standby buffer $6a$ together with branch route $3c$, station $4c$, branching devices $5g$, $5f$ and storage buffer $7a$ form an operating block C. These devices in each of the operating blocks A–C are controlled by a control facility provided in each operating block.

Figure 3:
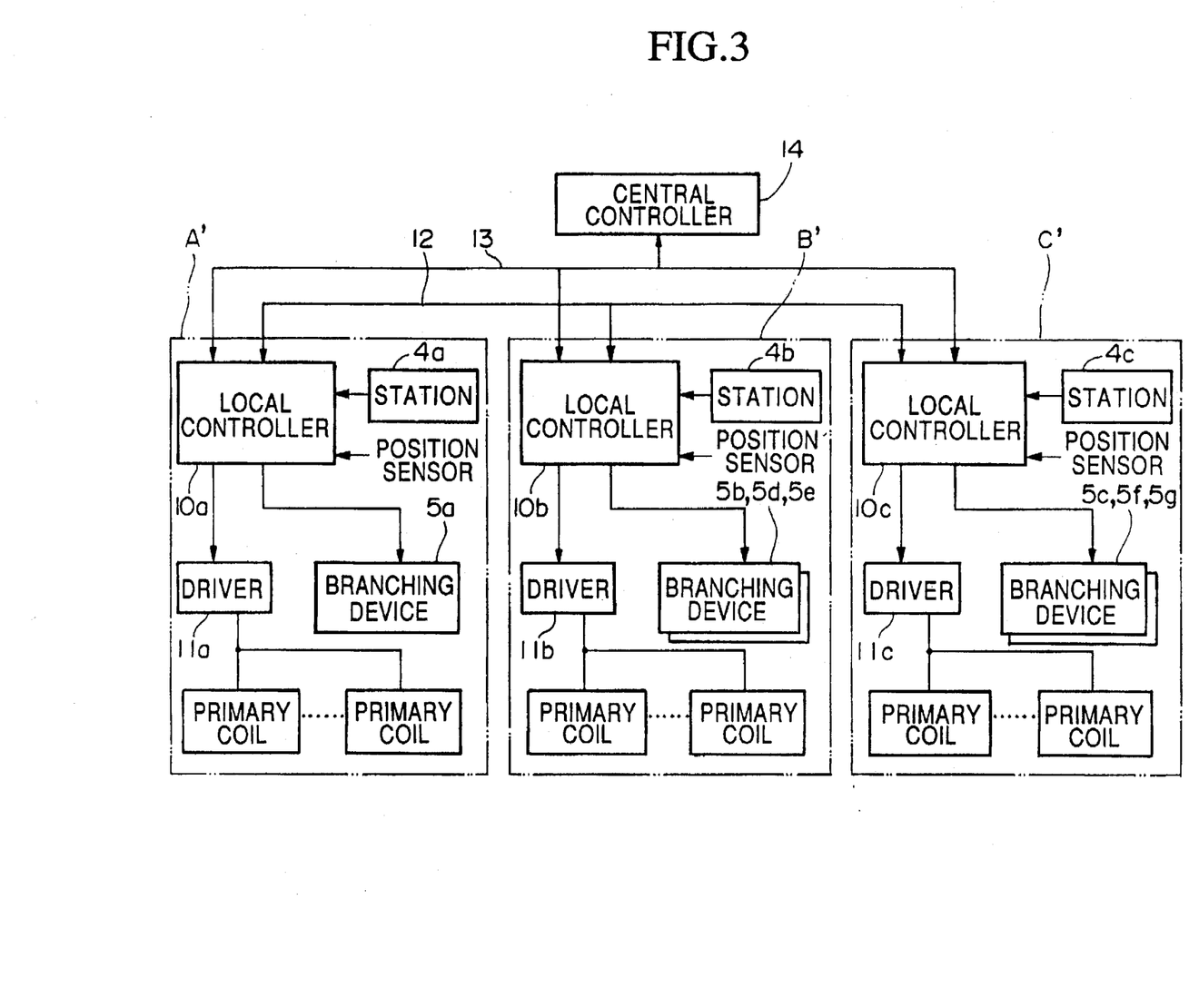
FIG. 3 is a block diagram for control process for the transport system.

The operation of the control facility will be explained in the following with reference to FIG. 3. The control facility are designated by A'~C' to correspond with operating blocks A~C: i.e., control facility A' for operating block A; control facility B' for the operating block B; and control facility C' for the operating block C. The control facility A'~C' are controllers for controlling the carriers which are operating within its assigned boundary.

For example, the control facility A' comprises devices within the operating block A: station 4b; branching devices 5a; the primary coils disposed on the travelling zone from 5a to standby buffer 6b as well as those disposed on the branch route 3a; a local controller 10a (operation control means); and the driver 11b. The local controller 10a controls the movement of various carriers located within the operating block A by driving the driver 11a and the branching device 5a in accordance with various transport commands input from station 4a and the position signals output by the various position sensors disposed along the track, as well as monitors the operating status of the devices within the control facility A'. The driver 11b directly controls the operation of the carriers 1a~1d by regulating the electrical current flowing in each of the primary coils.

The control facility B' comprises: station 4b; branching devices 5b, 5d and 5e; the primary coils disposed on the travelling zone from 5b to standby buffer 6e as well as those disposed on the branch route 3b; a local controller 10b; and the driver 11b. The local controller 10b controls the movement of various carriers located within the operating block B by driving the driver 11b and the branching devices 5b, 5d, and 5e in accordance with various transport commands input from station 4b and the position signals output by the various position sensors disposed along the track, as well as monitors the operating status of the devices within the control facility B'. The driver 11b directly controls the operation of the carriers 1a~1d by regulating the electrical current flowing in each of the primary coils.

The control facility C' comprises: station 4c; branching devices 5c, 5f and 5g; the primary coils disposed on the operating zone from 5c to standby buffer 6a as well as those disposed on the branch route 3c; a local controller 10c; and the driver 11c. The local controller 10c controls the movement of various carriers located within the operating block C by driving the driver 11c and the branching device 5c, 5f, and 5g in accordance with various transport commands input from station 4c and the position signals output by the various position sensors disposed along the track, as well as monitors the operating status of the devices within the control facility C'. The driver 11c directly controls the operation of the carriers 1a~1d by regulating the electrical current flowing in each of the primary coils.

Each of the local controllers 10a~10c are operatively connected to each other through optical communication lines 12, and when a carrier is being forwarded to another operating block, an identification (ID) number and the device number (given to each device) at the destination are sent to another local controller managing the events in that operating block to which the carrier is being forwarded. Each of the local controllers 10a~10c is connected to the central controller (system operation control means) 14 through communication lines 13, and periodically reports the operating status of the various devices within its own operating block to the central controller 14.

The central controller 14 performs the task of managing the overall carrier movement by storing information regarding the usage types of carriers 1a~1d and the types of carries allowed to enter each of the stations 4a~4c in its internal memory, and moving the carriers 1a~1d on the basis of the memorized information and the operating status of the devices. The central controller 14 also memorizes in its internal memory the storage buffers (either one of 7a or 7b in the system shown in FIG. 1) assigned to each of the stations 4a~4c for storage of in-bound carriers, as well as the minimum quantity of empty carriers (a specific quantity of empty standby carriers) waiting in the storage buffers 7a, 7b.

The operating status of the devices refer to such operational data as whether each of the devices is operating normally, is there a vacancy in the stopping berth, or whether any of the stations 4a~4c is shut down.

Each of the local controllers 10a~10c stores the following data in its internal memory in addition to those mentioned already.

(1) Map Data

The device number assigned to each of the devices within its own control block and the distance between the devices related by these numbers. For example, the local controller 10a managing the operating block A stores such data as: the device numbers assigned to station 4a, branching device 5a, and standby buffers 6a, 6b; and the distance between the branching device 5a to the standby buffer 6a. Similar data are stored in the internal memories of local controllers 10b, 10c.

(2) Moving Schedule Data

These data relate to a movement pattern of the carriers within each operating zone. For example, the local controller 10a manages a travelling zone from the branching device 5a to the standby buffer 6b. If carrier 1a is to pass through at a constant speed without stopping at the standby buffer 6b, its speed data is stored. If the carrier 1a is to be stopped at the standby buffer 6b, its slow down speed is memorized. Similar data are stored in the local controllers 10b, 10c.

When the device numbers specified by the stations 4a~4c are received in the local controllers 10a~10c, the local controllers 10a~10c dispatch carriers 1a~1d in the direction of the respective device numbers on the basis of the map data, and at the speeds specified in the memories. Within any one of the operating blocks A~C, only one carrier is allowed to proceed.

Some case examples of the movement of the carriers will be described in the following.

Case Example No. 1

The movement of a carrier will be explained with reference to the transport route shown in FIG. 1. In this case, an empty carrier 1a is parked at the stopping berth of the station 4a. This example relates to a case of moving the carrier 1a from station 4a in the direction of station 4c. The operator enters the device number of station 4c as the destination for the carrier 1a through the control panel 4-1. The local controller 10a sends the ID data for the carrier 1a and the device number for the station 4c to the central controller 14. The relevant ID number for the carrier 1a, at this time, is the number registered in the local controller 10a when the carrier 1a arrived at the station 1a, i.e. the preceding data related to the carrier 1a.

When the central controller 14 receives the above information, the controller 14 checks the following points on the basis of the operating status of the devices which are forwarded periodically from the local controllers 10a~10c.

(1) Are all the devices in the travelling zone for the station 4c operating normally?

(2) Are all the devices between the station 4a and 4c operating normally?

(3) Is there a vacant stopping berth in station 4c?

(4) Is there a carrier heading towards station 4c?

(5) Is station 4c open?

If, based on the result of the above analysis, the decision is made to send a carrier 1a towards the station 4c, the central controller 14 outputs a move-granted signal to the local controller 10a.

When the move-granted signal is received by the local controller 10a, a move-granted signal is displayed on the LCD screen 4-2. When the operator observes this message, he presses a move button 4-1f, and the local controller 10a begins the control operation of moving the carrier 1a. If the central controller 14 decides that the move cannot be granted, the controller 14 sends a move-denied signal to the local controller 10a which displays such a message on the LCD screen 4-2. In this case, the operator communicates with an operator in station 4c, using an interphone in station 4a, so that any obstacles causing the move-denied signal to be generated in station 4c can be removed.

Next, the local controller 10a decides to send the carrier 1a from the branching device 5a towards the standby buffer 6a on the basis of the map data and the device number of the destination station 4c described earlier. Then, the local controller 10a recognizes that the carrier 1a is heading toward the operating block B, and outputs an entry-request signal, including the device number of the destination station 4c and the ID number of the carrier 1a, to the local controller 10B which manages the operating block B. The local controller 10a then selects, from its internal memory, appropriate moving schedule on the basis of the response by the local controller 10b to the entry-request signal.

In other words, when the entry-granted signal is received, the local controller 10a selects a moving schedule which stops the carrier 1a at the branching device 5a in the travelling zone in the branch route 3a. Within the travelling zone between the branching device 5a to the standby buffer 6b, the moving schedule is selected to pass through the standby buffer 6b at a constant speed. If, on the other hand, an entry-denied signal is received, then the local controller 10a selects a moving schedule which would stop the carrier 1a at the standby buffer 6b.

Here, if the local controller 10b outputs an entry-granted signal to the local controller 10a, for example, then the local controller 10a commands the driver 11a to move the carrier 1a from station 4a towards the branching device 5a, and to stop the carrier 1a at the branching device 5a. In response, the driver 11a sets the switching order of the alternating power supply to the primary coils disposed on the branch route 3a so that the carrier 1a would proceed towards the branching device 5a. At the same time, the driver 11a sets the voltage to be applied to the primary coils so as to control the speed for the carrier 1a.

The position sensors disposed along the branch route 3a detects the position of the carrier 1a, and when the carrier 1a is detected at the branching device 5a, the local controller 10a transfers the carrier 1a from the branch route 3a to the main route 2 by operating the branching device 5a. The controller 10a allows the carrier 1a to proceed towards the standby buffer 6b, and commands the driver 11a so that the carrier 1a will proceed at a constant speed. In response, the driver 11a controls the current to be supplied to the primary coils so as to move the carrier 1a at a constant speed towards the standby buffer 6b.

Next, the local controller 10a confirms, through signals from the position sensors, that the carrier 1a has passed the standby buffer 6b, the controller 10a outputs a carrier 1a entry-warning signal to the local controller 10b. The local controller 10b, at this time, is already in possession of data concerning the ID number for the carrier 1a and the device number of the destination station 4c, in its internal memory, and is expecting to receive the entry-warning signal for the carrier 1a. Upon receiving the entry-warning signal, the local controller 1b confirms that the destination station is not one of the devices within its own operating block B, and outputs an entry-granted signal including the ID number of the carrier 1a and the device number of the destination station 4c to the local controller 10c for the operating block C.

Upon confirming that the carrier 1a has entered the operating block B according to the output signals from position sensors, the local controller 10b returns a entry-report signal to the local controller 10a. Upon receiving the entry-report signal, the local controller 10a ceases all operational controls on carrier 1a and transfers all the control functions to the local controller 10b. The local controller 10a goes into a waiting mode to await the next instruction.

In the meantime, the local controller 10b selects the moving schedule for the carrier 1a, on the basis of a response signal from the local controller 10c to the entry-granted signal forwarded thereto earlier, and moves the carrier 1a accordingly towards the operating block C by controlling the driver 11b. The selection and execution processes carried out by the local controller 10b, 10c are similar to those described above for the local controllers 10a, 10b. The destination station 4c is under the control of the local controller 10c, and on the basis of the entry-granted signal received from the local controller 10b, the local controller 10c confirms that the destination of carrier 1a is station 4c and selects a moving schedule which would stop the carrier 1a at the station 4c. Based on the data, the local controller 10c controls the driver 11c to stop the carrier 1a at the stopping berth in station 4c.

Case Example No. 2

Figure 4:
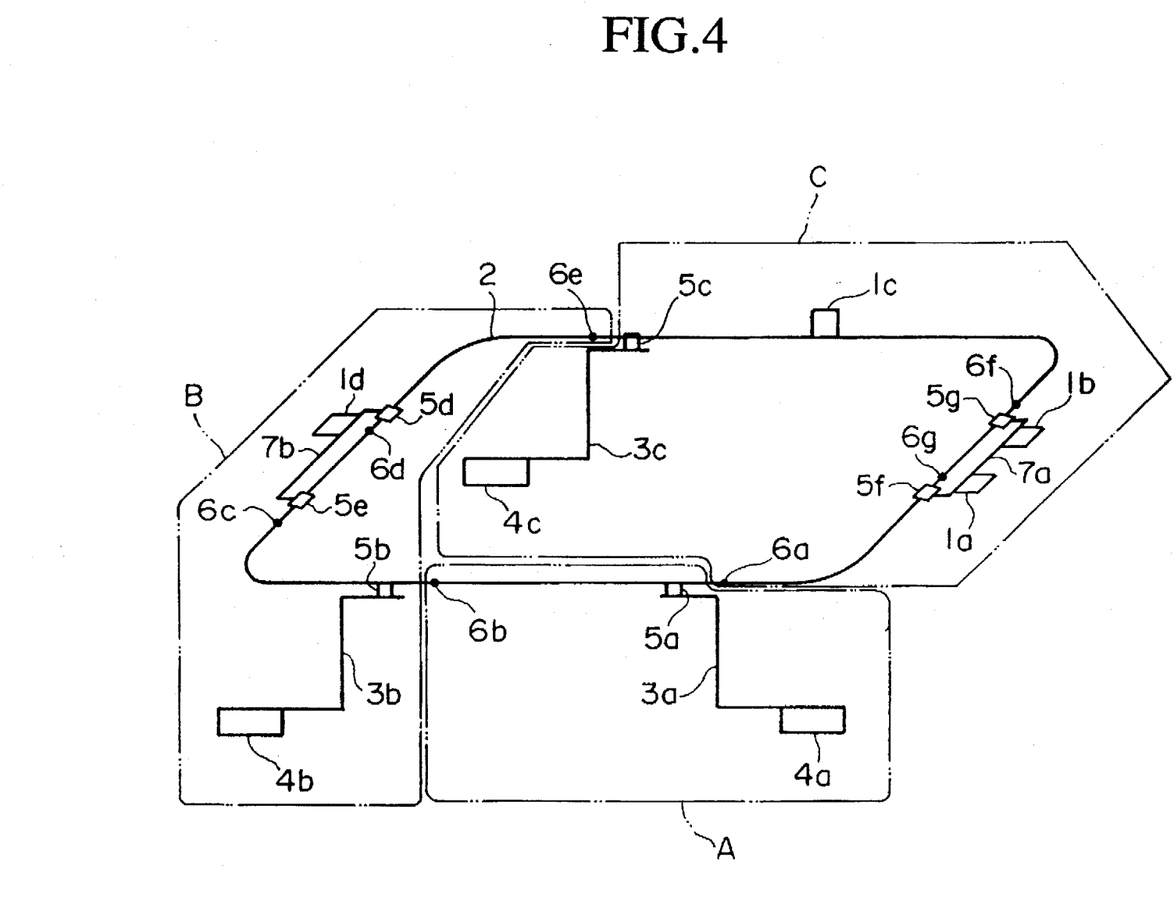
FIG. 4 is a schematic illustration of another example of the layout of the transport system of the present invention.

The movement of two carriers will be explained with reference to the transport route shown in FIG. 4. In this case, the carriers 1a, 1d are both sample carriers. For simplicity, it is assumed that the central controller 14 has memorized three carrier types: sample carriers; prescription carriers; and drug carriers. The first movement relates to the carrier 1a moving from station 4a towards station 4c.

An operator in station 4a presses a sample in-key 4-1a, then the local controller 10a outputs an in-bound sample carrier request signal to the central controller 14. In response, the central controller 14 examines the operating status of the devices, and finds that the carriers 1a in storage buffer 7a and a carrier 1d in storage buffer 7b are sample carriers. The central controller 14 decides to send the carrier 1a waiting in storage buffer 7a, which is closer to the destination station 4a than storage buffer 7b, and checks through the following points.

(1) Is station 4a qualified to accept sample carriers?

(2) Is there a vacant stopping berth in station 4a?

(3) Are all the devices between storage buffer 7a and station 4a operating normally?

(4) Is there a carrier already heading towards station 4a?

(5) Is station 4a open?

If, based on the result of the above analysis, the decision is made to send a carrier 1a towards the station 4c, the central controller 14 outputs a move-granted signal for the carrier 1a to the local controller 10c which controls the storage buffer 7a.

Here, it is to be noted, incidentally, that the central controller 14 memorizes the types of carrier which can be permitted into station 4a in its internal memory, therefore, if an in-bound general carrier request signal is issued from station 4a, the central controller 14 does not grant such a request. A signal to display the denial on the LCD screen 4-2 is output to the local controller 10a. This action is the same for other local controllers 4b, 4c.

Upon receiving the move-granted signal, the local controller 10c outputs an entry-request signal including the ID number for the carrier 1a and the device number for the destination station 4c to the local controller 10a. The local controller 10c decides, based on the Map Data presented above, that the movement direction for the carrier 1a is from the branching device 5f to the standby buffer 6a, and selects a moving schedule on the basis of the response signal to the entry-request signal output to the local controller 10a.

In other words, when the entry into the operating block A is granted, the local controller 10c selects a moving schedule to move the carrier 1a to proceed to the operating block A at a constant speed, without stopping in the standby buffer 6a. When the entry into block A is denied, the local controller 10c selects a moving schedule to stop the carrier at the standby buffer 6a. The conditions to deny entry into the operating block A include such events as another carrier parked in the stopping berth in station 4c, and the branching device 5c is not ready to accept entry of carrier 1a.

Proceeding with the case of entry into the operating block A, the local controller 4c moves the carrier 1a from the storage buffer 7a towards the branching device 5f, and outputs a signal to the driver 11c to stop the carrier 1a at the storage buffer 7a. The driver 11c sets the switching order of the alternating power supply to the primary coils disposed on the storage buffer 7a so that the carrier 1a can proceed towards the branching device 5f. At the same time, the driver 11c sets the voltage to be applied to the primary coils so as to stop the carrier 1a temporarily at the branching device 5f. The local controller 10c recognizes, from the output signals of the position sensors, that the carrier 1a has arrived at the branching device 5f, and moves the carrier 1a from the tracks in the storage buffer 7a to the tracks in the main route 2. The local controller 10c thus moves the carrier 1a towards the standby buffer 6a, and outputs a moving command signal to the driver 11c to move the carrier 1a at a constant speed to the standby buffer 6a. The driver 11, in accordance with the moving command signal, controls the current supplied to the primary coils to move the carrier 1a towards the standby buffer 6a.

In the meantime, the local controller 10a, recognizing that the carrier 1a has entered the operating block A, by the output signals from the position sensors, selects a moving schedule to stop the carrier 1a at the branching device 5a, enter the travelling zone of branch route 3a and stop the carrier 1a at the station 4a. The local controller 10a operates the driver 11a to stop the carrier 1a at the branching device 5a in accordance with the moving schedule. There, the local controller 10a operates the branching device 5a to transfer the carrier 1a from the main route 2 to the branch route 3a, and again commands to the driver 11a to stop the carrier 1a at the station 4a.

In the meantime, during the time interval from the inbound request signal to the arrival of the carrier 1a at station 4a, the LCD screen 4-2 in station 4a displays a message to indicate that a carrier is in-bound, and when the carrier 1a arrives at the station 4a, the message changes to an arrival massage.

Next, the operator loads samples in the container on the carrier 1a, and enters the device number of the destination station 4c. In response, the local controller 10a decides that the direction of movement of the carrier 1a on the main route 2 is towards the buffer 6b on the basis of Map Data, and outputs the ID number for the carrier 1a and the device number for the destination station 4c to the central controller 14. The central controller 14 checks the following points based on the designated use of the carriers 1a~1d, designated types for the station 4c, and the operating status of the various devices along the route forwarded from the local controllers 10a~10c.

(1) Is station 4c qualified to accept sample carriers?

(2) Are all the devices in the travelling zone between station 4a and station 4c operating normally?

(3) Is there a vacant stopping berth in station 4c?

(4) Is there a carrier already heading towards the station 4c?

(5) Is station 4c open?

If, based on the result of the above analysis, the decision is to send a carrier 1a towards the station 4c, the central controller 14 outputs a move-granted signal to the local controller 10a.

When the move-granted signal is received, the local controller 10a displays a move-granted signal for the carrier 1a on the LCD screen 4-2. The operator presses the move button 4-1f, the carrier 1a begins its move towards station 4c.

If the central controller 14 decides that the move cannot be granted, it outputs a move-denied signal to the local controller 10a. At this time, the local controller 10a displays a message that the move of the carrier 1a has been denied on the LCD screen 4-2. In this case, if the reason for the denial is related to station 4c, such as the presence of another carrier in station 4c, the operator in station 4a may, at times, contact the operator in station 4c through the interphone to return the carrier parked at the station 4c to the storage buffer 7a, 7b so that the carrier 1a can enter station 4c.

Next, the local controller 10a outputs an entry-request signal, including the ID number and the device number for the station 4c which is the destination station for the carrier 1a, to the local controller 10b which manages the operating block B. The local controller 10a then selects a moving schedule in accordance with the response signal to the entry-request signal.

In other words, when an entry-granted signal is received, the local controller 10a selects a moving schedule to stop the carrier 1a at the branching device 5a in the travelling zone in the branch route 3a. In the travelling zone between the branching device 5 to the standby buffer 6b, the local controller 10a selects a moving schedule to pass through the standby buffer 6b at a constant speed. On the other hand, if an entry-denied signal is received, the local controller 10a selects a moving schedule to stop the carrier 1a at the standby buffer 6a.

More specifically, when an entry-granted signal is received, the local controller 10a outputs a moving command signal to the driver 11a to move towards and stop the carrier 1a at the branching device 5a. Upon receiving such a moving command signal, the driver 11a sets the switching order of the alternating power supply to the primary coils disposed on the branch route 3a so that the carrier 1a would proceed towards the branching device 5a and, the driver 11c sets the voltage to be applied to the primary coils so as to control the speed of the carrier 1a. Upon recognizing that the carrier 1a has reached the branching device 5a by the signals from the position sensors, the local controller 10a operates the branching device 5a so that the carrier 1a is transferred from the tracks on the branch route 3a to the tracks on the main route 2. Further, the local controller 10a moves the carrier 1a towards the standby buffer 6b, and outputs a command signal to the driver 11a to move the carrier 1a at a constant speed to the standby buffer 6a. The driver 11a controls the current to the primary coil in accordance with the command signal.

Next, upon confirming from the output signals from the position sensors that the carrier 1a has departed from the operating block A, the local controller 10a outputs a carrier 1a entry-warning signal to the local controller 10b. Here, the local controller 10b had memorized the ID number for the carrier 1a and the device number of the destination station 4c in its internal memory, at the time of sending the entry-granted signal to the local controller 10a, and is in a waiting status waiting for an entry-warning signal. Based on the entry-warning signal, the local controller 10b confirms that the destination station for the carrier 1a is not within the operating block B, and forwards the entry-granted signal together with the ID number and the device number for the destination station 4c to the local controller 10c which manages the operating block C.

Also, when the local controller 10b confirms, by the output signals from the position sensors, that the carrier 1a has entered the operating block B, the local controller 10b outputs an entry-report signal to the local controller 10a. Upon receiving the entry-report signal, the local controller 10a ceases all operational controls on carrier 1a and passes all the control functions to the local controller 10b. The local controller 10a goes into a waiting mode to await the next instruction.

At this time, the local controller 10b selects a moving schedule for the carrier 1a within the operating block B on the basis of the response signal from the local controller 10c, and controls the driver 11b on the basis of the selected moving schedule to move the carrier 1a towards the operating block C. The subsequent steps of the local controllers 10b, 10c are the same as the series of steps taken by the local controllers 10a, 10b. When the local controller 10c recognizes that the destination station for the carrier 1a is a station within its own operating block, selects a moving schedule to stop the carrier 1a at station 4c, and control the driver 11c on the basis of the moving schedule, and stops the carrier 1a at the stopping berth in station 4c.

Case Example No. 3

This example relates to an empty carrier 1a waiting in the storage buffer 7a moving to station 4a. It is assumed that the central controller 14 has been pre-programmed that the carrier supply source nearest to station 4a is the storage buffer 7a.

An operator in station 4a presses a sample in-key 4-1a, then the local controller 10a outputs an in-bound request signal to the central controller 14. In response, the central controller 14 examines the operating status of the devices, such that (a) the stopping berth in station 4a is vacant and (b) the travelling zone including station 4a are operating normally, and outputs an entry-granted signal to the local controller 10a which manages the storage buffer 7a. The central controller 14 outputs a moving command signal to move the carrier 1a towards station 4a to the local controller 10c which manages the storage buffer 7a. The local controller 10c now assumes a waiting mode to wait for the carrier 1a to enter station 4a. During this interval, the local controller 10a displays a massage that an empty carrier is in-bound on the LCD screen 4-2.

Upon receiving the moving command signal, the local controller 10c outputs an entry-request signal including the ID number of the carrier 1a and the device number of the destination station 4a to the local controller 10a. The local controller 10c decides from the Map Data that the carrier 1a is to be moved from the branching device 5f in the direction of the standby buffer 6a, and selects a moving schedule on the basis of the response signal to the entry-request signal.

For example, if the entry-denied signal is received to deny entry into the operating block A, the local controller 10c selects a moving schedule to stop the carrier 1a at the standby buffer 6a, and if the entry-granted signal is received, a moving schedule is selected to move the carrier 1a through the standby buffer 6a without stopping. The reasons for denying entry into the operating block A include, a carrier is stopped at the stopping berth in station 4a, or the branching device 5a is not in a condition to accept entry of the carrier 1a.

Assuming that an entry-granted signal is received, the local controller 10c outputs a moving command signal to the driver 11c so that the carrier 1a is moved from the storage buffer 7a towards the branching device 5f and stop at the branching device 5f. Upon receiving such a moving command signal, the driver 11a sets the switching order of the alternating power supply to the primary coils so that the carrier 1a would proceed towards the branching device 5f, and the driver 11c sets the voltage to be applied to the primary coils so as to control the speed of the carrier 1a. Upon recognizing that the carrier 1a has reached the branching device 5f by the signals from the position sensors, the local controller 10c operates the branching device 5f so that the carrier 1a is transferred from the tracks on the storage buffer 7a to the tracks on the main route 2. The local controller 10a moves the carrier 1a towards the standby buffer 6a, and outputs a command signal to the driver 11a to move the carrier 1a at a constant speed to the standby buffer 6a. The driver 11a controls the current to the primary coil in accordance with the command signal.

In the meantime, when the local controller 10a recognizes by the output signal from the position sensors that the carrier 1a has entered the operating block A, selects a moving schedule to stop the carrier 1a at the branching device 5a, and to stop the carrier 1a at the station 4a in the travelling zone 3a. The driver 11a is controlled accordingly and the carrier 1a is stopped at the branching device 5a. The local controller 10a operates the branching device 5a so as to transfer the carrier 1a from the tracks in the main route 2 to the tracks on the branch route 3a, and again controls the driver 11a to stop the carrier 1a at the stopping berth in station 4a. During this interval, the LCD screen 4-2 displays a massage that a carrier is in-bound, and when the carrier 1a arrives at station 4a, the message is changed to indicated a carrier arrival.

In the meantime, if the central controller 14 recognizes that, as a result of transferring one carrier 1a from the storage buffer 7a to station 4a, the empty carriers waiting in the storage buffer 7a has decreased below a specific quantity, the central controller 14 outputs a moving command signal to the local controller 10b which manages the storage buffer 7b to transfer a carrier 1d to the storage buffer 7a. Accordingly, the local controller 10c transfers a carrier 1d from the storage buffer 7b to storage buffer 7a by following the same procedure taken by the local controller 10c.

The beneficial effects of the transport system of the present invention will be reviewed in the following summary.

(1) Flexibility of the System

The transport system is divided into operating blocks, and each operating block is accompanied by its own control facility. Each control facility is associated with a local controller which exercises control over the movement of carriers not only within its own block but beyond the boundary of its own block. When a carrier is located within its own block, control over the carrier movement is exercised by knowing a carrier destination and carrier position data. When a destination beyond its own operating block is specified, carrier ID number and the station number of the destination station are forwarded to a local controller disposed in the block where the destination station is located. Therefore, the entire transport system is constituted by an operating unit consisting of an operating block and its paired control facility. It is, therefore clear that the entire system can be expanded, or contracted as a need arises, by adding or deleting operating units with their paired control facilities.

(2) Efficiency of the System

When a station in a block needs an in-bound carrier, a local controller responsible for managing the carrier movement within that block seeks a permission for an in-bound carrier from a central controller, and when the permission is granted, the local controller outputs an entry-request signal to a local controller which manages the block for the carrier to pass through or to stop at a destination station so that the carrier may enter the next block without any problems. In other words, before beginning a carrier movement, the operating conditions of the relevant devices are double checked, first by the central controller and second by the local controllers in the current block and the adjoining block. Therefore, there is less chance of a carrier being held up temporarily in the main route because of reasons such as unable to enter a station because of a parked carrier in the destination station. The operating efficiency of the transport system is thus improved significantly.

(3) Superior Hygienic Control

Because of the improved efficiency of the system, it is possible to provide dedicated carrier types to carry only designated goods, i.e. prescriptions, samples, pharmaceutical and general goods, and each station allows an entry of certain types of carriers only. This arrangement aids in maintaining hygienic conditions in each station, and yet preserve the operating efficiency of the transport system.

(4) Rapid Response

Because all the stations are interconnected through interphones, an operator in one station can communicate with another operator in another station, thus improving communication capability of the system so that in an emergency situation, a parked carrier in a destination station can be quickly removed to a storage buffer. Therefore, the system is designed to respond rapidly to an emergency request.

(5) Rapid Communications

The local controllers are able to communicate with each other through an optical communication network, thus providing highspeed communication means to enable a quick and efficient response.

(6) Quiet Operation

The carriers are driven by linear induction motors, thus providing a quiet and vibration-free operation. The system is therefore ideally suited to a hospital environment.

(7) Simple Construction

Each carrier is driven by a secondary conductor provided on the carrier, and the result is that the carriers need not be provided with mechanical driving devices, and the carrier construction is simplified.

(8) Designed for Small Goods

Each carrier is provided with many containers to carry specific items such as reports, X-ray films, drug containers and test samples. This design allows a maximum and efficient use of the available space on each carrier so as to make the transport system especially suitable for hospital operations.

The transport system of the present invention is not limited to those embodied in the above case examples. The following is a list of some possible modifications.

(1) The system was illustrated with three operating blocks A–C, but it is obvious the system need not be limited to such a number. It has been demonstrated that the system comprises a plurality of operating units consisting of an operating block and a control facility to provide independent as well as interactive control functions.

(2) The examples were based on a central controller to check on the operating status of each device in relevant blocks and to interact with a plurality of local controllers to operate the carriers. However, a transport system may be designed so that local controllers can interact with each to exchange information regarding the operating status of each device in its own operating block, to manage the overall system.

(3) An inefficient operation can be prevented by arranging the central controller to not grant a carrier to a station whose request will exceed its stopping berth capacity. For example, if station 4b requests another carrier to station 4c shortly after requesting a carrier to station 4a, then the central controller 12 will output a movement-denied signal to station 4b and displays the denial message on the screen as well as the reason for denial. By this approach, it is possible to prevent a unnecessary entering of a carrier into a standby buffer from the main route to interfere with other carriers waiting for in-bound calls in the standby buffer.

(4) Other example of inefficient operation is an abnormality in a destination station. If an abnormality is detected in a destination station when a carrier is already on its way to the destination station, the central controller will command the local controller in the operating block to change the carrier destination from the destination station to a storage buffer. The local controller then changes the device number of the destination station to a device number of a storage buffer, and parks the carrier temporarily in the storage buffer. When the abnormality is resolved at the destination station, the central controller issues a change signal to the local controller which then changes the device number back to the destination station, and the local controller at the destination will take over control to guide the carrier to the destination station. By this approach, it is possible to prevent a unnecessary entering of a carrier into a standby buffer from the main route to interfere with other carriers waiting for in-bound calls in the standby buffer.

(5) When a station request an empty in-bound carrier, the central controller checks whether there is a (loaded/empty) carrier on its way to the station making the request. If it detects such a carrier, the in-bound request for an empty carrier is denied, and displays that a (loaded/empty) carrier is on its way to the requesting station on the screen. By this arrangement, it is possible to avoid wasteful movement of an empty carrier.

(6) In a hospital setting, demand for moving prescription carrier is high. It is cumbersome for the operator to respond to every such request. For these station requiring a large number of in-bound prescription carriers, prescription carriers are stored in the nearest storage buffer, and a regular scheduled trip may be made between the requesting station and a destination station, so that a carrier is made available automatically on a periodic basis. By making such a scheduled movement of prescription carriers, prescriptions can be transported efficiently, and the efficiency of the overall system operation is improved.

(7) The above examples were based on having two storage buffers. However, it is permissible to provide more storage buffers. For example, if there are three storage buffers a, b and c, and if the count of carriers in storage buffer a drops below a specific quantity, then carriers may be preferentially supplied from the nearest storage buffer b. When the carriers in storage b becomes lower than a specific quantity, carriers may be supplied to storage buffer b from storage buffer c.

(8) It is possible to provide a gyroscopic device on the carrier so that the containers may be held level at all times to make certain that spillage of liquid samples would not occur during transport.

What is claimed is:

1. A transport system for a plurality of carriers comprising:

track means having a plurality of position sensors for detecting locations of the carriers as they are driven by a linear induction motor along said track means;

a plurality of stations along said track means capable of being specified as a destination of a selected one of said carriers;

said transport system being functionally divided into a plurality of operating blocks, each of said blocks having an operation control means;

system operation management means for management of said transport system according to data supplied from said operation control means of said plurality of operating blocks;

a said operation control means controlling movement of one of said carriers according to a specified destination station and an output signal from at least one of said position sensors that has been actuated by said one carrier;

said operation control means of a block mutually supplying station destination data and an identification number of said one carrier to the operation control means of the block containing the destination station of the one carrier if the destination station is located outside of the block at which said one carrier is located;

each of said operation control means supplying said system operation management means with operation status data of the corresponding operating block for use in management of said transport system by said system operation management means; and said system operation management means outputting a command signal to transfer said carrier to a standby track disposed in a branch route when an abnormality is detected in the specified destination station.

2. A transport system as claimed in claim 1, wherein said system operation management means commands said operation control means to stop dispatching an out-bound carrier to a station requesting carriers in excess of an allowable number of carriers to be parked in said station.

3. A transport system as claimed in claim 1, wherein said system operation management means denies a request for dispatching an empty carrier to a station when another carrier is heading towards said station.

4. A transport system comprising:

a plurality of carriers each designated to carry a specific class of goods, and each driven by a linear induction motor;

a plurality of stations each of which is designated to allow entry of carriers carrying predetermined classes of goods upon being designated as a destination for a carrier;

a track means for moving said carriers between said plurality of stations;

operation control means for controlling movement of each of said carriers upon reception of station destination data from a station according to the class data of goods carried by a carrier and a class data of said station;

wherein said operation control means permits entry of a said carrier only if said specific class of goods carried matches the specific class of said station.

5. A transport system comprising:

a plurality of carriers each designated to carry a specific class of goods, and each driven by a linear induction motor;

a plurality of stations each of which is designated to allow entry of carriers carrying predetermined classes of goods;

track means on which said carrier are moved, said track means having a plurality of position sensors for detecting location of said carriers along said track means;

said transport system being functionally divided into a plurality of operating blocks, each of said operating blocks being provided with an operation control means;

system operation management means for management of said transport system according to data supplied from a plurality of operation control means;

wherein a said operation control means controls movement of one of said carriers according to a specified destination station and an output signal from at least one of said position sensors that has been actuated by said one carrier;

said operation control means of a block mutually supplying destination data and an identification number of said carrier to the operation control means of the destination block of the said one carrier if said destination is located outside of the block where said one carrier is originally located;

each of said operation control means supplying said system operation management means with operation status data of the corresponding operating block for use in management of said transport system by said system operation management means; and said system operation management means permitting entry of said carrier to the destination station only if said specific class of goods carried by said one carrier is matched with said specific class of goods of said station.

6. A transport system as claimed in claim 4, wherein said carriers are classified into a prescription carrier for containing only a prescription, a sample carrier for containing only a test sample, a drug carrier for containing only a pharmaceutical and a general goods carrier for containing general items.

7. A transport system for a plurality of carriers comprising:

track means having a plurality of position sensors for detecting a location of each of a plurality of carriers which are driven by a linear induction motor along said track means;

a plurality of stations along said track means each capable of being specified as a destination of said carriers;

a plurality of standby track means branching from said track means for parking of waiting in-bound carriers;

operation control means for controlling movement of each of said carriers according to a specified destination station and an output signal from at least one of said position sensors;

wherein said operation control means supplies additional in-bound carriers from at least one other standby track means if the number of in-bound carriers in a said standby track means is not more than a predetermined number.

8. A transport system for a plurality of carriers comprising:

track means having a plurality of position sensors for detecting a location of a plurality of carriers which are driven by a linear induction motor along said track means;

a plurality of stations along said track means each being capable of being specified as a destination of said carriers;

a plurality of standby track means branching from said track means for parking waiting in-bound carriers;

said transport system being functionally divided into a plurality of operating blocks, each of which is provided with an operation control means;

system operation management means for carrying out management of said transport system according to data supplied from said operation control means of said plurality of blocks;

wherein said operation control means controls movement of one of said carriers according to a specified destination station and an output signal from at least one of said position sensors that has been actuated;

said operation control means mutually supplying a destination data and an identification number of said one carrier to said operation control means of the other operating blocks if said destination of said one carrier is located outside the operating block of said one carrier from which said one carrier originates;

each of said operation control means supplying said system operation management means with operation status data of the corresponding operating block for use in management of said transport system by said system operation management means; and said system operation management means supplying additional in-bound carriers from other standby track means if the number of in-bound carriers in a said standby track means is not more than a specific number.

* * * * *